United States Patent
Bell et al.

(10) Patent No.: US 9,947,044 B2
(45) Date of Patent: Apr. 17, 2018

(54) IMPROPER FINANCIAL ACTIVITY DETECTION TOOL

(71) Applicant: Bank of America Corporation, Charlotte, NC (US)

(72) Inventors: Kolt Bell, Charlotte, NC (US); David Barnhardt, Huntersville, NC (US); Amijo Bearley, Oxford, PA (US); Robert J Dominguez, High Point, NC (US); David Kerman, Charlotte, NC (US); Daniel Van Vliet, Jacksonville, FL (US)

(73) Assignee: Bank of America Corporation, Charlotte, NC (US)

( * ) Notice: Subject to any disclaimer, the term of this patent is extended or adjusted under 35 U.S.C. 154(b) by 381 days.

(21) Appl. No.: 14/148,080

(22) Filed: Jan. 6, 2014

(65) Prior Publication Data
US 2015/0193865 A1 Jul. 9, 2015

(51) Int. Cl.
*G06Q 40/00* (2012.01)
(52) U.S. Cl.
CPC ................ *G06Q 40/00* (2013.01)
(58) Field of Classification Search
CPC .............................................. G06Q 40/00
USPC ........................................ 705/35–45
See application file for complete search history.

(56) References Cited

U.S. PATENT DOCUMENTS

| | | | |
|---|---|---|---|
| 7,458,508 B1 | 12/2008 | Shao et al. | |
| 7,562,814 B1 | 7/2009 | Shao et al. | |
| 7,575,157 B2 | 8/2009 | Barnhardt et al. | |
| 7,686,214 B1 | 3/2010 | Shao et al. | |
| 7,793,835 B1 | 9/2010 | Coggeshall et al. | |
| 7,856,494 B2 | 12/2010 | Kulkarni et al. | |
| 8,151,327 B2 | 4/2012 | Eisen | |
| 8,285,636 B2 | 10/2012 | Curry et al. | |
| 8,386,377 B1 | 2/2013 | Xiong et al. | |
| 8,438,644 B2 | 5/2013 | Watters et al. | |
| 9,104,665 B1 * | 8/2015 | Bik | G06F 17/30958 |

(Continued)

OTHER PUBLICATIONS

FICO, Uncovering Bust-Out Fraud With FICO®, Identity Resolution Engine, Dec. 2013, 9 pages.

(Continued)

*Primary Examiner* — Chia-Yi Liu
(74) *Attorney, Agent, or Firm* — Banner & Witcoff, Ltd.; Michael A. Springs

(57) ABSTRACT

An illustrative method for identifying information associated with a ring of individuals performing improper financial activities may include combining a list of user identifiers with one or more attributes tables corresponding to the financial transactions. A computer device may analyze a first list of identifiers in relation to an attribute table, where the identifiers may be associated with one or more suspected improper financial activities and the attribute table may include attributes of one or more financial transactions performed over a specified duration. The computer device may then link the first list of identifiers with one or more attributes included in the attribute table to determine a second list of identifiers and the process may be repeated until a stopping condition has been reached. After the stopping condition has been met, the computer device may communicate a report to a user.

19 Claims, 4 Drawing Sheets

(56) References Cited

U.S. PATENT DOCUMENTS

| | | | | |
|---|---|---|---|---|
| 2003/0061597 A1* | 3/2003 | Curtis | ............... | G06F 11/076 |
| | | | | 717/128 |
| 2009/0254379 A1* | 10/2009 | Adams | ............... | G06Q 10/04 |
| | | | | 705/4 |
| 2011/0087495 A1* | 4/2011 | O'Neill | ............... | G06Q 10/10 |
| | | | | 705/1.1 |
| 2012/0101930 A1* | 4/2012 | Li | ............... | G06Q 40/02 |
| | | | | 705/35 |
| 2015/0170147 A1* | 6/2015 | Geckle | ............... | G06Q 40/02 |
| | | | | 705/44 |

OTHER PUBLICATIONS

CGI Group Inc., Implementing social network analysis for fraud prevention, copyright 2011 CGI Group Inc., 7 pages.

Ellen Joyner, Detecting and Preventing Fraud in Financial Institutions, SAS Global Forum 2011, Paper 029-2011, Enterprise Fraud management, SAS Institute Inc., Cary, NC, USA, 16 pages.

Financial Crimes Enforcement Network, Identity Theft: Trends, Patterns, and Typologies Based on Suspicious Activity Reports, filed by the Securities and Futures Industries Jan. 1, 2005-Dec. 31, 2010, Sep. 2011, 53 pages.

Infoglide Software, Busting Fraud Rings with Social Link Analysis, copyright 2012 Infoglide Software, 13 pages.

* cited by examiner

IMPROPER FINANCIAL ACTIVITY DETECTION TOOL

BACKGROUND

With the advent of electronic banking, financial institutions and their customers may increasingly be subject to improper financial activity on one or more accounts. In some cases, individual persons may be solely responsible for making the improper financial transactions. However, in other cases, a "ring" of individuals may work together in performing more widespread improper financial activity. In such cases, both the customers of the financial institution and the financial institution itself may be subject to a higher risk of financial loss as a result of the ring's activities. To uncover the ring's activities, financial institutions may monitor financial transactions for indications of improper financial activity. When an indication is found, the associated financial transaction may be flagged for further analysis. Information about the flagged financial transactions may be aggregated, or otherwise grouped, for further analysis. For example, the information may be referred to an analytics department of the financial institution to determine whether an indicator of coordinated improper financial activities may be found.

In such cases, an analyst may receive a referral including information about one or more flagged financial transactions. The analyst may then manually construct queries of one or more data stores storing financial transaction information. The analyst may use their own discretion to determine which data may be relevant. The analyst may continue until they believe that they have an understanding of a pattern of activity, if any. Such a procedure may be time consuming and/or expensive, because each incremental piece of linked data takes time to obtain, to analyze, and to determine whether more information is needed. These methods may also lead to inconsistent results, because the amount of data retrieved is often left to the analyst's discretion.

SUMMARY

In light of the foregoing background, the following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

A computerized method for identifying information associated with a ring of individuals performing improper financial activities may include combining a list of user identifiers with one or more attributes of the financial transactions. A computer device may analyze a first list of identifiers in relation to an attribute table, where the identifiers may be associated with one or more suspected improper financial activities and the attribute table may include attributes of one or more financial transactions performed over a specified duration. The computer device may then link the first list of identifiers with one or more attributes included in the attribute table to determine a second list of identifiers and the process may be repeated until a stopping condition has been reached. After the stopping condition has been met, the computer device may communicate a report to a user. An illustrative report may include at least a portion of the first list of identifiers and/or the second list of identifiers that have been linked with one or more attributes of the attribute table.

An illustrative system that may be used for identifying information associated with a ring of individuals performing improper financial activities may include a computer including a processor and a memory communicatively coupled to the processor. The memory device may be configured to store instructions that, when executed by the processor, cause the computer to receive a first list of identifiers, via a communication link. The first list of identifiers may correspond to a suspected pattern of improper financial activity during a specified time period. In some cases, at least one identifier in the first list of identifiers may be associated with a financial transaction within the specified time period. The instructions may further cause the computer to link at least one identifier in the first list of identifiers to an attribute in an attribute table. The attribute table may correspond to one or more attributes of financial transactions performed during a specified duration. In some cases, the computer device may communicate, via the communication link, a report to a user. The report may include at least a portion of the first list of identifiers that have been linked to one or more attributes of the attribute table.

In some cases, another illustrative method may include receiving, by a computer device, a first list of identifiers associated with one or more financial transactions suspected of improper financial activity within a specified time period and joining the first list of identifiers to an attribute table that may correspond to at least one attribute of a financial transaction. The method may further include creating, by the computer device, a first composite table using at least one identifier that is linked to at least one attribute. In some cases, each row of the first composite table may correspond to an individual identifier and an attribute linked to the identifier. The computer device may then create a second composite table based on the first composite table. For example, the second composite table may include a row corresponding to each of the linked identifiers and a row corresponding to each of the linked attributes. The method may then include generating, by the computer device, a second list of identifiers that may correspond to the identifiers included in the second composite table. The steps of joining the identifier list to an attribute table, creating the first composite table, creating the second composite table and generating a new list of identifiers may be repeated until a specified stopping condition has been met. The computer may then be configured to communicate at least the final composite table and generated list of identifiers to a user, such as via a network.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

A more complete understanding of aspects of the present disclosure and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which the disclosure may be practiced. It is to be understood that other embodiments may be utilized and structural and functional modifications may be made.

Figure 1:
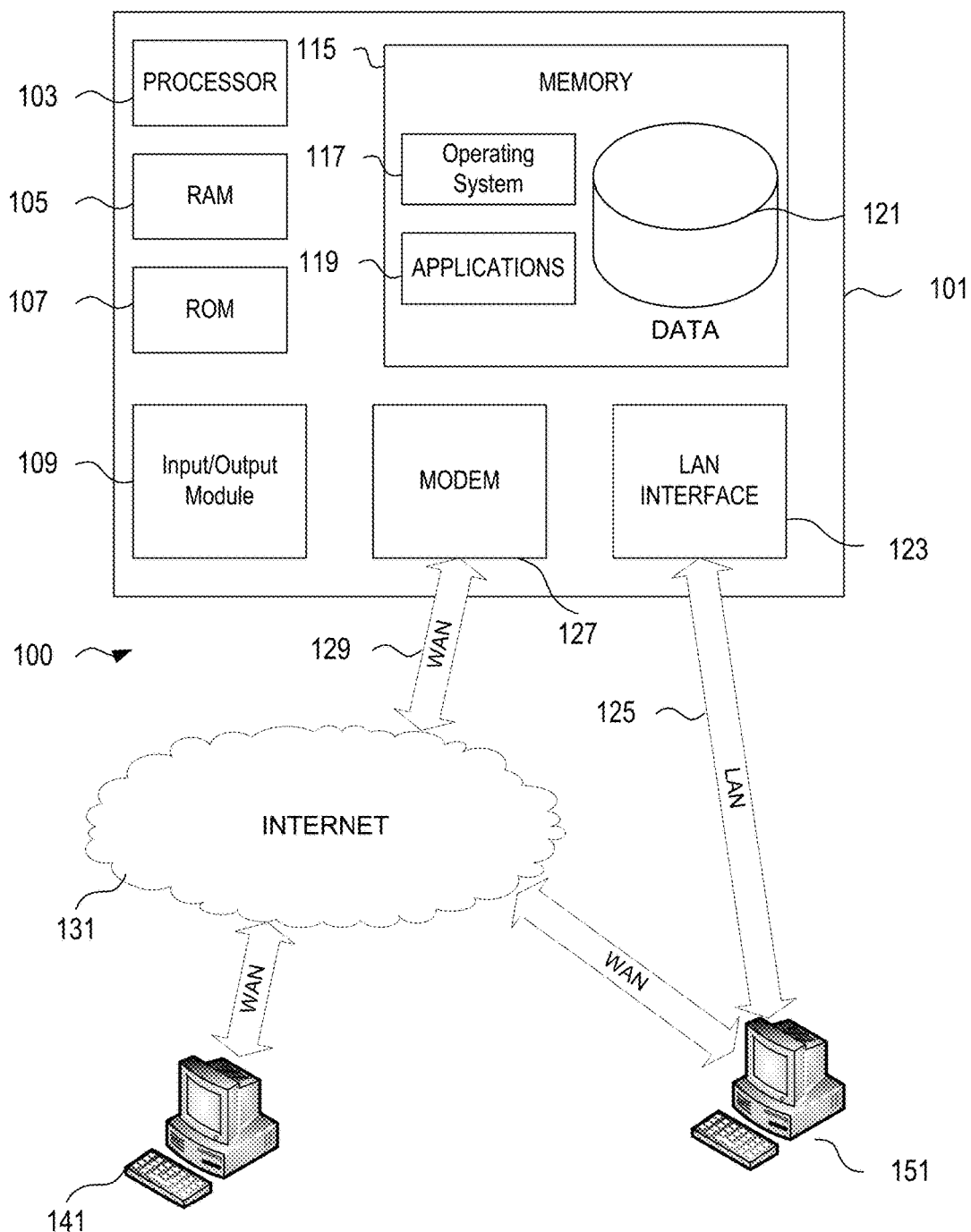
FIG. 1 illustrates a schematic diagram of a general-purpose digital computing environment in which certain aspects of the present disclosure may be implemented.

FIG. 1 illustrates a block diagram of a generic computing device 101 (e.g., a computer server) that may be used according to an illustrative embodiment of the disclosure. The computer server 101 may have a processor 103 for controlling overall operation of the server and its associated components, including RAM 105, ROM 107, input/output (I/O) module 109, and a memory 115.

The I/O module 109 may include a microphone, keypad, touch screen, and/or stylus through which a user of the computing device 101 may provide input, and may also include one or more of a speaker for providing audio output and a video display device (e.g., a user interface) for providing textual, audiovisual and/or graphical output. Software may be stored within the memory 115 and/or other storage to provide instructions to the processor 103 for enabling the server 101 to perform various functions. For example, the memory 115 may store software used by the server 101, such as an operating system 117, one or more application programs 119, and an associated database 121. Alternatively, some or all of the computer executable instructions utilized by the computing device 101 may be embodied in hardware or firmware (not shown). As described in detail below, the database 121 may provide centralized storage of account information and account holder information for the entire business, allowing interoperability between different elements of the business residing at different physical locations.

The server 101 may operate in a networked environment supporting connections to one or more remote computers, such as the terminals 141 and 151. The terminals 141 and 151 may be personal computers or servers that include many or all of the elements described above relative to the server 101. The network connections depicted in FIG. 1 may include a local area network (LAN) 125 and a wide area network (WAN) 129, but may also include other networks. When used in a LAN networking environment, the computing device 101 is connected to the LAN 125 through a network interface or adapter 123. When used in a WAN networking environment, the server 101 may include a modem 127 or other means for establishing wired and/or wireless communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, an application program 119 used by the server 101 according to an illustrative embodiment of the disclosure may include computer executable instructions for invoking user functionality related to communication, such as email, short message service (SMS), and voice input and speech recognition applications.

The computing device 101 and/or the terminals 141 or 151 may also be mobile terminals (e.g., a cell phone, a tablet computer, a laptop computer, a smart phone, and the like) that may include various other components, such as a battery, speaker, and/or antennas (not shown).

The disclosure is operational with numerous other general purpose or special purpose computing system environments or configurations. Examples of computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules may include routines, programs, objects, components, data structures, and the like for performing particular tasks or implementing particular abstract data types. The disclosure may also be practiced in distributed computing environments where tasks are performed by remote processing devices that are linked through a communications network. In a distributed computing environment, program modules may be located in both local and remote computer storage media including memory storage devices.

Figure 2:
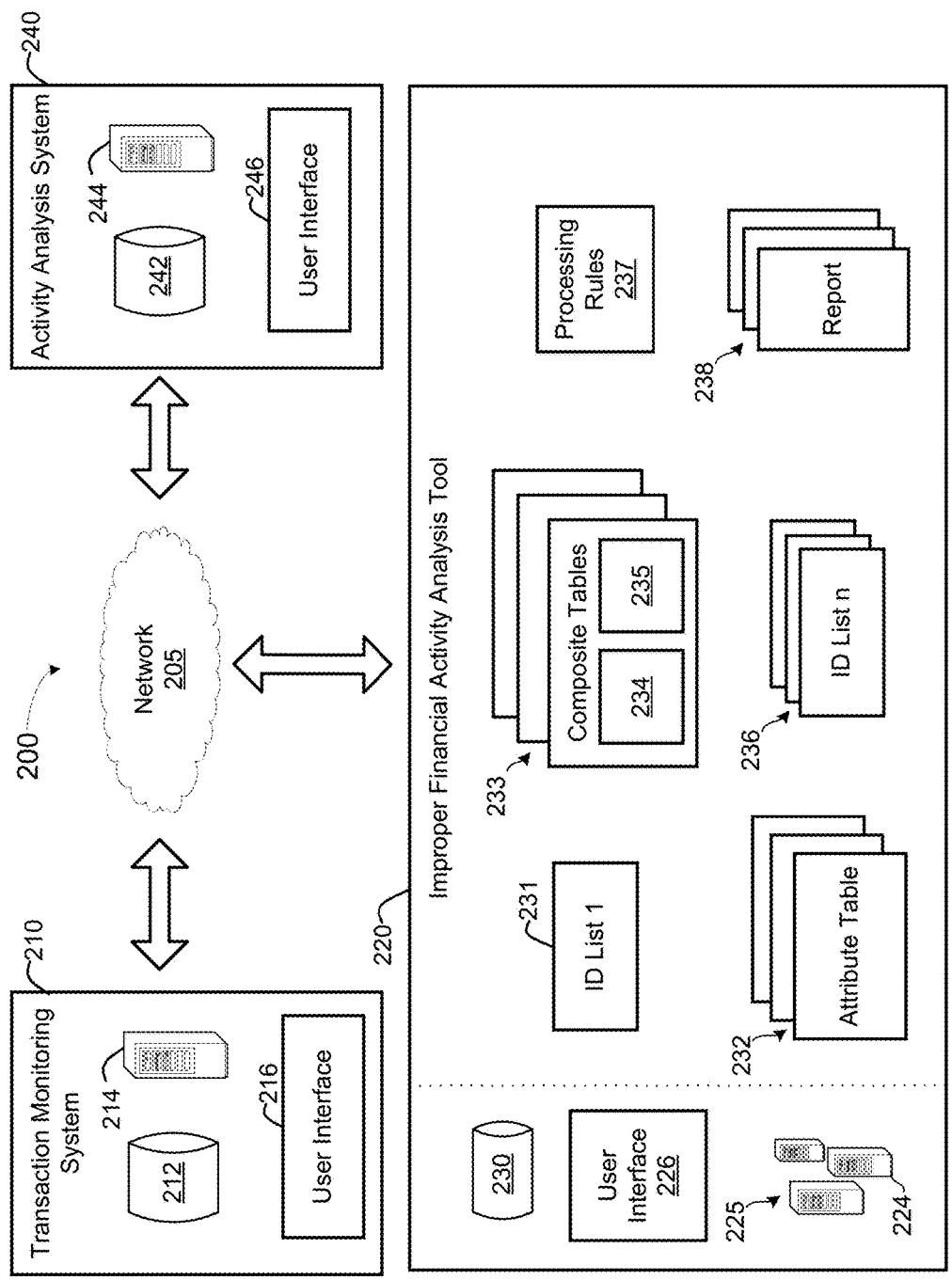
FIG. 2 is an illustrative block diagram of a system for identifying information associated with a ring of individuals performing improper financial activities according to one or more aspects of the present disclosure.

FIG. 2 is an illustrative block diagram of a system 200 for identifying information associated with a ring of individuals performing improper financial activities according to one or more aspects of the present disclosure. The system 200 may include a network 205 that may communicatively couple a transaction monitoring system 210, an improper financial activity analysis tool 220, and an activity analysis system 240. In some cases, each of the transaction monitoring system 210, the analysis tool 220, and the activity analysis system 240 may be associated with a financial institution, such as a bank, an investment house, and the like. Sometimes, however, one or more of the transaction monitoring system 210, the analysis tool 220, and the activity analysis system 240 may be associated with different organizations. For example, a financial institution may monitor financial transactions for signs of improper financial activities using the transaction monitoring system 210 and/or use the analysis tool 220 to determine information indicative of improper financial activity. The financial institution may then forward any suspect information (e.g., identifiers with or without linked attributes, tables, reports, and the like) to a user for further analysis. In some cases, the financial institution may forward the suspect information to another organization, such as a law enforcement agency, for further analysis.

In a global environment, financial transactions may occur and/or be initiated between parties at different geographical locations. In some cases, a total volume of world-wide transactions associated with a financial institution may be large thus making centralized monitoring difficult. In such cases, the transaction information may be processed at a facility local to one or more parties of the transaction. In other cases, the transaction information may be communicated to one or more sites that may be used for processing transaction information on a regional and/or global basis. In some cases, the transaction monitoring system 210, the analysis tool 220, and the activity analysis system 240 may be located at a single site and/or geographic location. In other cases, one or more of the transaction monitoring system 210, the analysis tool 220, and the activity analysis system 240 may be distributed between different sites and/or geographical locations.

In some cases, the transaction monitoring system 210 may include a data repository 212, at least one server 214, (e.g., the computing device 101) and/or a user interface 216. The data repository 212 may be part of a data warehouse that may receive financial receive and/or store financial transaction information received from numerous data sources of financial transaction information. In some cases, the data repository 212 may be stored on one or more different hardware devices, such as a server, a redundant array of independent disks (RAID), or other such device useful in storing and/or accessing large amounts of data. The server 214 may be configured to run an application that is configured to monitor one or more financial transaction for suspected improper activity such as by using a mathematical algorithm and/or comparing financial transactions stored in the data repository 212 to known instances of improper financial activity. In some cases, the user may enter searching criteria and/or view results from one or more searches performed by the server 214 via one or more user interface screens. When improper financial activity has been indicated, the financial institution may further analyze the financial transaction information to determine whether a pattern of improper financial activity can be identified and/or whether a group of individuals (e.g., a "ring") is responsible for any or all, of the pattern of improper financial activity. Once identified, one or more user identifiers may be assembled in a list and communicated to the analysis tool 220 via the network 205 for further analysis. In some cases, the transaction monitoring system 210, or other similar data source, may provide assemble and/or identify sources of financial transaction information relating to a particular period of time associated with the activity of the suspected ring of individuals. This additional information may be organized according to one or more attributes of financial transactions, such as in one or more attribute tables. The attributes may include, an email address, a physical address, an account owner, hypertext transfer protocol information (e.g., a sentinel cookie, and the like), an incoming phone number, an a phone number associated with the account, a depositing account number, a receiving account number, hardware information (e.g., a device fingerprint), a business owner, an internet protocol (IP) address, and the like. These attribute tables may also be accessible to the analysis tool 220 for use in combining the attribute table with the list of suspect identifiers.

In some cases, the identifier list may be merged and/or joined with one or more of the attribute table using one or more different methods of combining tables and/or database information, such as by using a software suite providing coding tools to facilitate advanced analytics, business intelligence, data management, and/or predictive analytics. In some cases, the coding tools may include coding instructions to facilitate searching and/or manipulating data stored in a data repository. For example, these coding tools may include procedure statements that may be used to perform analysis, or otherwise, examine the data within a database. In some cases, these software tools may be combined with one or more different scripting languages to provide allow for further data management capabilities for the information held in a relational database management system, such as the data repositories 212, 230, and/or 242. For example, the scripting language may be used to insert data into relational databases, perform queries, update, modify and/or delete data within the relational database and/or control access to the data within the relational database.

The analysis tool 220 may be located at a site and/or facility that is the same as a site associated with the transaction monitoring system 210, the activity analysis system 240, or both. In some cases, the analysis tool 220 may be located at a different site. The analysis tool 220 may be implemented as instructions stored in a memory, such as the memory 115, which may be associated with a high-risk financial activity identification device 224, such as one or more of the servers 225. The high-risk financial activity identification device 224 may be communicatively coupled to a user interface 226 and a data repository 230 that may be stored, at least in part, in the memory associated with the servers 225. The user interface 226 may include one or more user interface screens that may facilitate the use of the analysis tool 220. For example, the user interface 226 may allow a user to view an identifier list received from the transaction monitoring system 210. In some cases, the user interface 226 may allow a user to enter the identifier list manually and/or edit a stored identifier list. The user interface 226 may also include one or more screens that may be used to control the operation of the analysis tool 220, such as the user interface screen 400 of FIG. 4.

Figure 3:
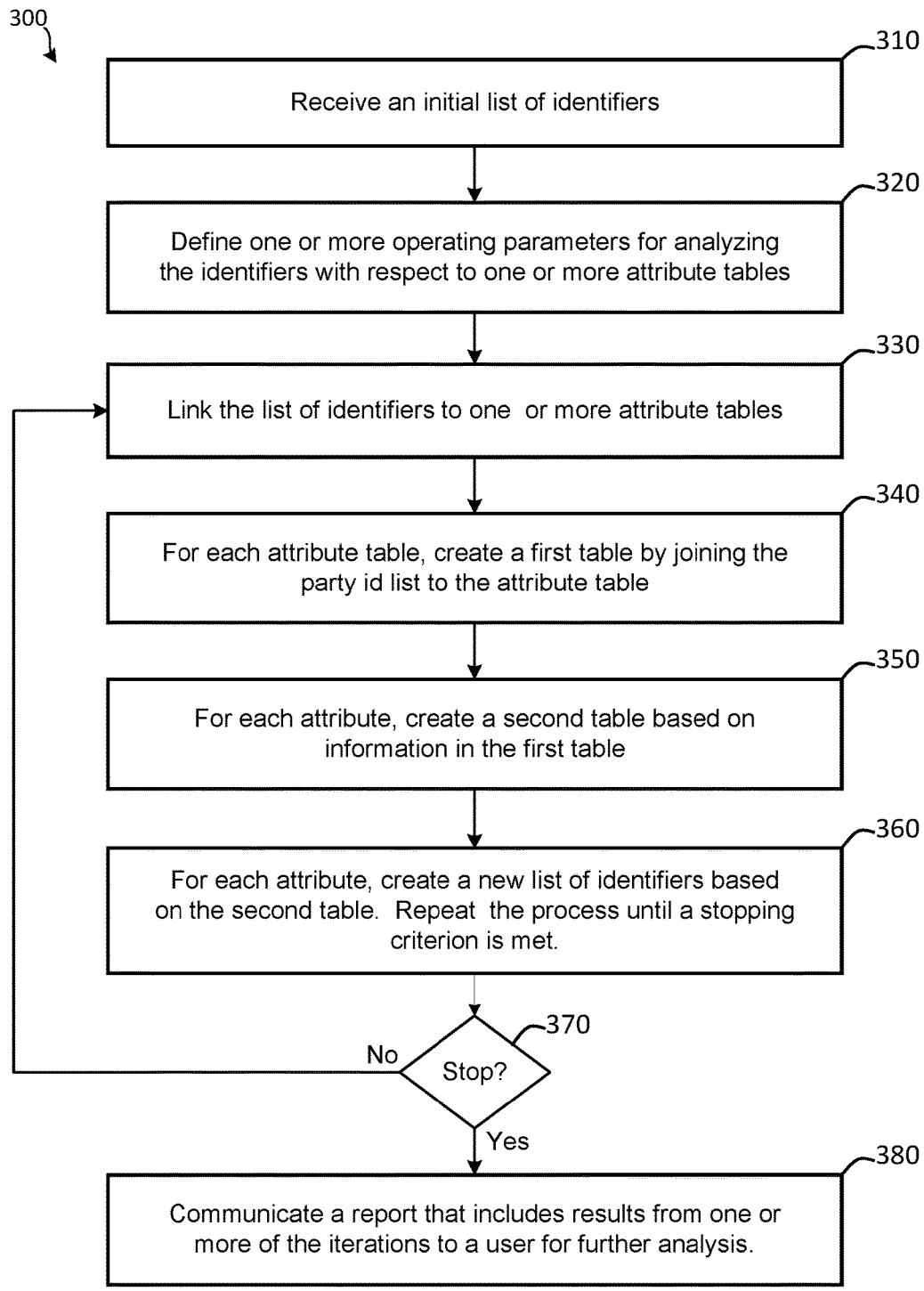
FIG. 3 is a flowchart of an illustrative method for identifying information associated with a ring of individuals performing improper financial activities by the system of FIG. 2 according to one or more aspects of the present disclosure.

The data repository 230 may be used to store instructions that cause the analysis tool 220, that when executed by a processor, cause the high-risk financial activity identification device 224 to perform a technique to analyze an identifier list 231 in relation to one or more attribute tables 232, such as illustrated in the method 300 of FIG. 3. The high-risk financial activity identification device 224 may be configured to use the analysis tool 220 to process a referral, such as an initial identifier list 231, which may be received from the transaction monitoring system 210 via the network 205 and/or via the user interface 226. As discussed above, the initial identifier list 231 may include one or more user identifiers that may be suspected of being associated with improper financial activity performed by a ring of individuals. The analysis tool 220 may process the initial identifier list 231 in relation to one or more financial transaction attribute tables 232 associated with financial transactions performed over a specified duration (e.g., about 30 days, about 60 days, about 90 days, about 6 months, and the like). The analysis tool 220 may analyze an identifier list in relation to one or more attributes of a financial transaction, such as an attribute (e.g., email address, phone number, account number, and the like) corresponding to each of the one or more attribute tables 232. For example, the analysis tool 220 may be configured to join, merge, or otherwise combine one or more identifiers included in the identifier list 231 with an attribute in each of one or more of the attribute tables 232 to produce the composite tables 233. For example, the improper financial activity analysis tool 220 may join the identifier list 231 of Table 1 with one or more of the attribute tables 232 of Tables 2 and 3 to produce a first composite table 234.

TABLE 1

Identifier List

Party_ID aaaaaaaaaa
bbbbbbbbbb
cccccccccc
dddddddddd

TABLE 2

Attribute List - Incoming Phone Number

| Party_ID | Incoming Phone # | Datetime |
|---|---|---|
| aaaaaaaaaa | (aaa1) nnn-nnnn1 | Aug. 8, 2013 12:00 |
| aaaaaaaaaa | (aaa1) nnn-nnnn2 | Aug. 9, 2013 12:00 |
| bbbbbbbbbb | (aaa3) nnn-nnnn3 | Aug. 8, 2013 12:00 |
| eeeeeeeeee | (aaa4) nnn-nnnn4 | Aug. 10, 2013 12:00 |
| gggggggggg | (aaa2) nnn-nnnn5 | Aug. 8, 2013 12:00 |
| cccccccccc | (aaa2) nnn-nnnn5 | Aug. 8, 2013 13:00 |
| hhhhhhhhhh | (aaa2) nnn-nnnn5 | Aug. 8, 2013 12:30 |
| ssssssssss | (aaa2) nnn-nnnn5 | Aug. 8, 2013 12:40 |
| ssssssssss | (aaa5) nnn-nnnn6 | Aug. 11, 2013 12:00 |
| rrrrrrrrrr | (aaa2) nnn-nnnn1 | Aug. 7, 2013 12:00 |
| rrrrrrrrrr | (aaa5) nnn-nnnn6 | Aug. 7, 2013 12:40 |
| yyyyyyyyyy | (aaa5) nnn-nnnn6 | Aug. 8, 2013 12:00 |
| wwwwwwwwww | (aaa5) nnn-nnnn5 | Aug. 9, 2013 12:00 |
| uuuuuuuuuu | (aaa6) nnn-nnnn7 | Aug. 10, 2013 12:00 |
| zzzzzzzzzz | (aaa1) nnn-nnnn7 | Aug. 8, 2013 12:00 |
| xxxxxxxxxx | (aaa2) nnn-nnnn8 | Aug. 8, 2013 12:00 |

TABLE 3

Attribute List - email address

| Party_ID | email |
|---|---|
| aaaaaaaaaa | email address 1 |
| bbbbbbbbbb | email address 2 |
| gggggggggg | email address 3 |
| jjjjjjjjjj | email address 3 |
| nnnnnnnnnn | email address 3 |

As can be seen in the illustrative Tables 2 and 3, each attribute table includes one or more entries corresponding to an attribute of one or more financial transactions during a particular time period. For example, the incoming phone number attribute table may include different incoming phone numbers used during a financial transaction over a specified time period (e.g., a week), where each row corresponds to a particular transaction. The attribute tables 232 may also include one or more other attributes associated with the same financial transaction during the particular time period. For example, the attribute table illustrated in Table 2 includes a party identifier and a date associated with each incoming phone number for each transaction (e.g., a table row). The illustrative email address attribute list includes a party identifier corresponding to a particular email address. In some cases, the time period associated with each of the attribute tables 232 may be the same time period. In other cases, the time periods may be different.

The composite tables 233 may correspond to a combination of a particular party identifier list 231 and at least one of the attribute tables 232. In some cases, the first composite table 234 may include a row corresponding for each party identifier of the party identifier list 231 and a matching attribute of the particular attribute table. For example, the analysis tool 220 may match use a matching party identifier to link a particular attribute to a party identifier. Table 4 illustrates a first composite table 234 that the analysis tool 220 may create using the party identifier list of Table 1 and the attribute table of Table 2. Similarly, Table 5 illustrates a first composite table 234 that the improper financial activity analysis tool 233 may create using the party identifier list of Table 1 and the attribute table of Table 3.

TABLE 4

First Composite table - Incoming Phone Number Attribute

| Incoming Phone # | Count | Source Identifier |
|---|---|---|
| (aaa1) nnn-nnnn1 | 2 | aaaaaaaaaa |
| (aaa1) nnn-nnnn2 | 2 | aaaaaaaaaa |
| (aaa3) nnn-nnnn3 | 2 | bbbbbbbbbb |

TABLE 5

First Composite table - Email

| Email | Count | Identifier |
|---|---|---|
| email address 1 | 2 | aaaaaaaaaa |
| email address 2 | 2 | bbbbbbbbbb |

In some cases, the composite table 234 may include further information associated with the linked party identifiers and attributes. For example, each row may include a count that corresponds to a number of instances that a particular input party identifier and attribute combination were linked using the attribute table data for the specified time period.

The analysis tool 220 may be configured to further create a second composite table 235 based, at least in part, on the first composite table 234. The analysis tool may analyze the information in the first table to determine a number of identifiers and a number of attributes. The second composite table 235 may be created by joining, or otherwise merging, the first composite table with the particular attribute table joined with the identifier list 231. For example, for example, for the incoming phone number attribute, the composite table of Table 4 may be joined with the attribute table of Table 2, and for the email attribute, the composite table of Table 5 would be joined with the attribute table of Table 3.

TABLE 6

Second Composite table - Incoming Phone Number

| Incoming Phone # | Count | Identifier |
|---|---|---|
| (aaa1) nnn nnnn1 | 2 | aaaaaaaaaa |
| (aaa1) nnn nnnn1 | 2 | aaaaaaaaaa |
| (aaa1) nnn nnnn2 | 2 | aaaaaaaaaa |
| (aaa1) nnn nnnn2 | 2 | aaaaaaaaaa |
| (aaa3) nnn nnnn1 | 2 | bbbbbbbbbb |

TABLE 6

Second Composite table - Incoming Phone Number

| Email | Count | Identifier |
|---|---|---|
| email address 1 | 1 | 10000000001 |
| email address 2 | 1 | 10000000002 |

After joining the table, the second composite table 235 may be created where a row may be created for each linked attribute in the Attribute table and a row may be created for each linked identifier linked to the attribute. In some cases, other information may be included to assist in tracing the links between the attributes and the identifiers, such as a count. When multiple attributes are analyzed, a set of composite tables 233 of the first composite table 234 and the second composite table 235 may be created for each of the different attribute tables 232.

After creating the second composite table 235, the analysis tool 220 may be configured to create an identifier list based, at least in part, on the second composite table 235 for each of the different attribute tables 232 being analyzed. Each of the different identifier lists 236 may then be fed back through the process. For example, the identifiers listed in the second composite table 235 of Table 5 may be used as a new master identifier list that may be used to create new, and potentially larger, composite tables 233 when joined with the incoming phone number attribute table of Table 2. This process may continue until a specified stopping condition has been reached. The stopping condition may be indicated using one or more processing rules 237. The processing rules 237 may include a maximum output size a maximum number of iterations, and the like. In some cases, the processing rules 237 may include rules that may be used to define one or more thresholds for use with individual attribute tables. For example, one or more rules may be defined to exclude data based on an exclusion list (e.g., a whitelist, and the like), a link count threshold (e.g., a maximum count, a minimum count, or both), and the like.

In some cases, a different identifier list 236 may be created for each of the different attribute tables 232 linked to the original identifier list 231. In some cases, the analysis tool 220 may have a modular implementation, such that each attribute table is analyzed individually, or such as a unified implementation. For example, in a unified implementation after the new identifier lists 236 have been created for each of the different attribute tables 232, the different identifier lists 236 may be merged to create a unified identifier list. The unified identifier list may be used as a master identifier list that may then be joined with each of the different attribute tables 232. In this method, an identifier linked with a first attribute table (e.g., the incoming phone number attribute) may be used to link new identifiers with any different attribute (e.g., the email attribute). Additionally, hybrid implementations (e.g., a partly modular implementation, a partly unified implementation, and the like) may be possible. For example, identifiers obtained using a particular attribute table may be used with some, or all, different attribute tables 232. However, other attribute tables, or portions thereof may be excluded from being used with other attribute tables 232. For example, attribute tables 232 that give "soft" links (e.g., links which have a high false positive rate, or are otherwise less reliable) may not be used when linking with other different ones of the attribute tables 232. For example, some attributes may be considered as highly reliable data sources and would result in identifiers that may be chosen to be linked with other attribute tables 232. In some cases, other attributes may produce less reliable links, and may not be chosen to provide inputs to link with other attribute tables. For example, phone number attributes that may be associated with a trunk line may be considered to provide less reliable links, and therefore, any identifier derived using a source including the trunk lines may be excluded from being used with other different attribute tables such as the email attribute table.

Once a stopping condition has been reached, the recursive process may stop and the analysis tool may provide at least a portion of the identifier lists 231, 236, the attribute tables 232 and/or the composite tables 233 to an activity analysis system 240. The activity analysis system 240 may include a data repository 242, at least one computer device (e.g., the server 244) and/or a user interface 246. The data repository 242 may be used to store at least some of the identifier lists 231, 236, the attribute tables 232, the composite tables 233 and/or the reports 238 after being received via the network 205. The activity analysis system may then present information provided by the analysis tool 220 and/or the transaction monitoring system 210 to a user, such as via at least one user interface screen presented by the user interface 246. The user may then analyze the identifiers identified by the analysis tool in relation to transaction information and/or previously known improper activity information (e.g., known identities, known improper activities, known improper activities, and the like).

In an example, a system may include a high-risk financial activity identification device 224, such as the server 225 and/or another computing device 101, which may include a processor and a memory. The memory may be configured to store instructions, that when executed by the processor, may cause the computer device to receive a first list of identifiers 231 via a communication link (e.g., the network 205). The list of identifiers 231 may be referred from the transaction monitoring system 210 and/or another source. The referral may correspond to a suspected pattern of improper financial activity during a specified time period. In some cases, at least one identifier in the referred identifier list 231 may be associated with a financial transaction within the specified time period. In some cases, the instructions may further cause the high-risk financial activity identification device 224 to link at least one identifier in the list of identifiers 231 to an attribute in at least one of the attribute tables 232. The attribute tables 232 may correspond to one or more attributes of financial transactions performed during a specified duration. The computer device may then be configured to communicate, via the communication link 205, a first report 238 to a user. The report 238 may include at least a portion of the first list of identifiers linked with one or more attributes of the first attribute table. The reports may further include at least a portion of the composite tables 233, and/or the attribute tables 232. In some cases, the report may further identify a time period being examined, data sources from which the transaction information was obtained and/or any processing rules 237 used by the analysis tool 220.

In some cases, the instructions stored in the memory may further cause the high-risk financial activity identification device 224 to generate a second list 236 of identifiers that may correspond to one or more identifiers that have been linked with at least one attribute of an attribute table 232. Once created, the second list 236 may then be used at least to repeat the linking step and the generating step based on the second list of identifiers 236. In some cases, this recursive process may repeat until a specified condition (e.g., a maximum number of links, a maximum number of iterations, and the like) has been met. If not, the iterative process may continue. If so, the high-risk financial activity identification device 224 may generate and/or communicate a report to the activity analysis system, where the report may include results of the iterative process.

The system may further include a transaction monitoring system 210 including a computing device (e.g., the server 214) that may be configured to identify one or more financial transactions corresponding to potential improper financial activity and determine, based on the analysis, one or more user identifiers associated with the suspect financial transactions. The user identifiers may be communicated via the network 205 to the analysis tool 220 to be used as, or included with the identifier list 231.

The high-risk financial activity identification device 224 may be configured to link identifiers to attributes included in two or more different attribute tables 232. In some cases, at least one identifier in the list of identifiers 231 may be linked to an attribute in a first attribute table, and at least one identifier may be linked to an attribute in a second attribute table different from the first attribute table. In these cases, composite tables 233 may be generated based on the links to the first attribute table and other composite tables 233 may be generated based on the links to the second attribute table. As before, the recursive process may continue until a stopping condition has been met. In some cases, a different stopping condition may be defined for each of the different attribute tables 232 being linked to the identifier lists 231, 236. Once the stopping condition has been met the analysis tool 220 may communicate, via the communication link 205, one or more reports to the activity analysis system 240, the report including at least a portion of the first list of identifiers linked with one or more attributes of the second attribute table. In some cases, the high-risk financial activity identification device 224 may be configured to generate an identifier list from two or more of the composite tables 233. In some cases, this identifier list may be linked with one or more of the attribute tables 232 in another iteration of the process.

FIG. 3 shows a flowchart of an illustrative method 300 for identifying information associated with a ring of individuals performing improper financial activities by the high-risk financial activity identification device 224 of FIG. 2 according to one or more aspects of the present disclosure. The computerized method 300 may include, at 310, receiving, by the high-risk financial activity identification device 224 implementing the analysis tool 220, a list of identifiers 231 from a transaction monitoring system 210, such as via a communication network 205. At 320, a user may define one or more operating parameters via the user interface 226. The operating parameters may be used by the analysis tool 220 in implementing one or more of the rules 237. For example, the user may enter a threshold value for stopping the iterative process, such as a maximum number of iterations and/or a maximum number of links. At 330, the analysis tool may link the list of identifiers 231 to one or more of the attribute tables 232. In some cases, the linking may be done by joining and/or merging the list of identifiers 231 to the attribute table(s).

At 340, for each attribute table, the analysis tool 220 may create a first composite table 234 by joining the identifier list 231 to the one or more attribute tables 332. In some cases, the method may include creating a row for each identifier of the identifier list 231 that may be linked to an attribute in the attribute table 232. At 350, the analysis tool 220 may then create a second composite table 335 based, at least in part, on the first composite table 334, the identifier list 231 and the one or more attribute tables 232. For example, the analysis tool 220 may create a table having a row for each of the identifiers and a row for each of the attributes linked to the identifiers in the list of identifiers 231. At 360, the analysis tool may create a different list of identifiers 236 based, at least in part, on the second composite table 235. The method may include repeating steps 330-360 until a stopping condition has been met. At 370, the analysis tool 220, may determine whether or not the specified stopping condition (e.g., a maximum number of iterations, a maximum list size, a maximum table size, and the like) had been met, such as by using the rules 237. If not, the process repeats steps 330-360 for each of the desired attributes tables 232 using the newly create identifier lists 236. If so, at 380, the analysis tool may generate and/or communicate a report corresponding to the identifier lists 236, the composite tables 235 and the initial identifier list 231 and/or the attribute tables 232.

Figure 4:
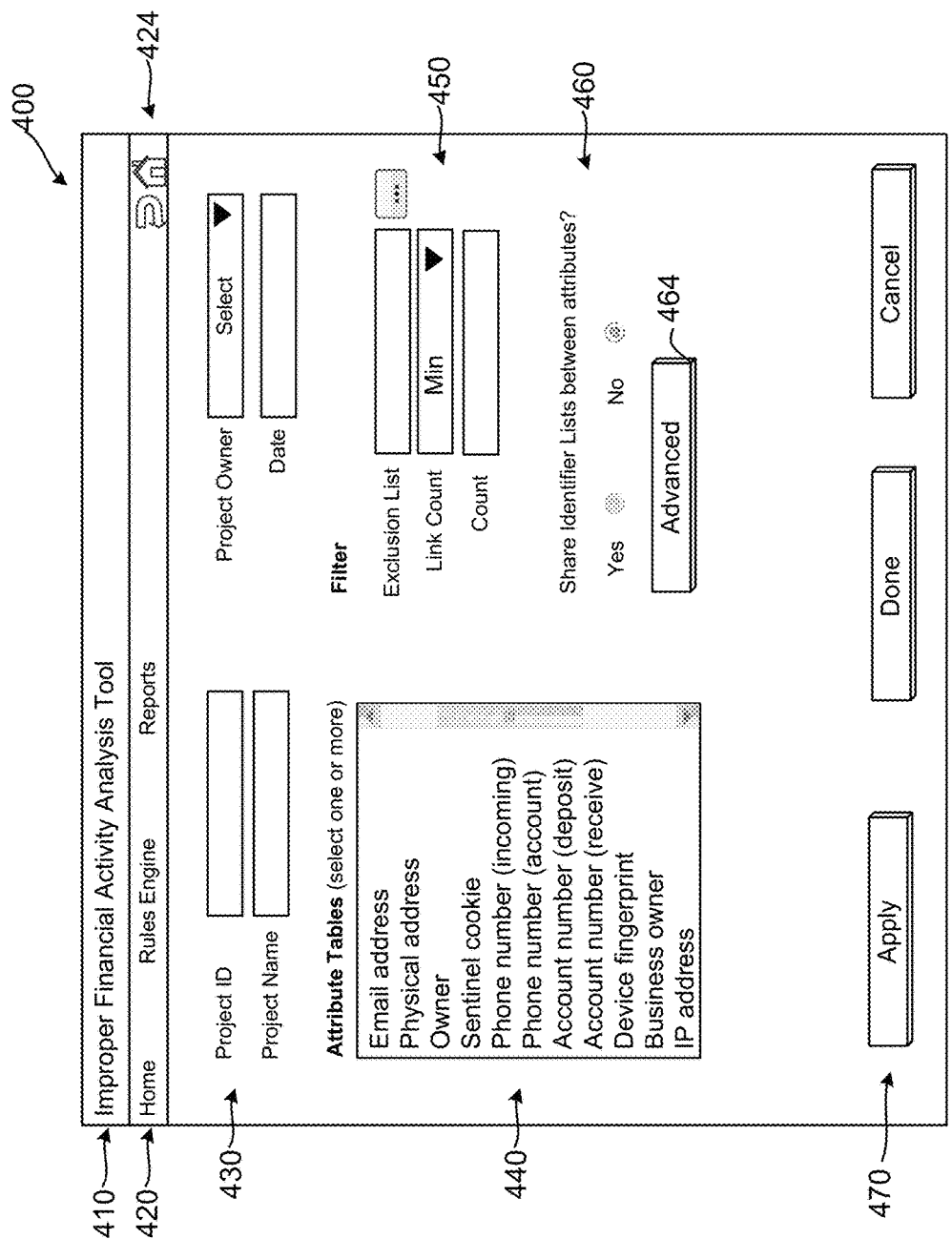
FIG. 4 shows an illustrative user interface screen to facilitate operation of the system of FIG. 2 using the illustrative method of FIG. 3.

FIG. 4 shows an illustrative user interface screen 400 that may be presented to a user via the user interface 226 and may facilitate operation of the system of FIG. 2 using the illustrative method of FIG. 3. The illustrative screen 400 may include a title field 410 that may include information, navigation buttons 424, and/or menu items 420 to allow a user to more easily navigate and/or interact with the analysis tool 220. A project area 430 may be used to facilitate entry of information about an analysis project. For example, a user may entire project identification information including a project identifier, a project name, a project owner, and a date of analysis. The screen 400 may include an attribute table field 440 that may be used to specify which one, or more, of the attribute tables 232 to analyze with the identifier lists 231, 236. For example the user may select one or more of an email address, a physical address, an owner name, a sentinel cookie, a phone number (e.g., incoming, account, and the like), an account number (e.g., a depositing account, a receiving account, and the like), a device fingerprint, a business owner, an IP address, and the like. The screen 400 may include a filter field 450 that may be used to define operating parameters for one or more rules 237 used when combining the identifier list 231, 236 with the one or more attribute fields in the attribute table 232. For example, the user may define an exclusion list by specifying a link to a file. In some cases, the user may enter one or more of a minimum number of links, a maximum number of links, or both. In some cases, the screen 400 may include selection buttons 460 to allow a user to specify whether or not an identifier list is to be linked to one or more different attribute tables 232. For example, the user may select that the identifier tables 231, 236 may be linked to two or more different attribute tables 232. Otherwise, the user may select a modular implementation where each attribute list 232 is to be linked with separate identifier lists 236. The screen 400 may also include buttons 470 that may allow a user to apply, save and/or cancel any edits to the operating parameters.

Although not required, one of ordinary skill in the art will appreciate that various aspects described herein may be embodied as a method, a data processing system, or as a computer-readable medium storing computer-executable instructions. Accordingly, those aspects may take the form of an entirely hardware embodiment, an entirely software embodiment or an embodiment combining software and hardware aspects. For example, a computer-readable medium storing instructions to cause a processor to perform methods in accordance with aspects of the disclosure is contemplated.

While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present disclosure. The description is thus to be regarded as illustrative instead of restrictive on the present disclosure.

What is claimed is:

1. A method to electronically identify a plurality of individuals performing improper financial activity, the method comprising:

monitoring, by a transaction monitoring system at a first network location, a plurality of financial transactions for signs of improper financial activity, wherein the plurality of financial transactions are electronic transactions received via a plurality of remote computing devices;

generating, by the transaction monitoring system, a first list of identifiers, the first list of identifiers comprising one or more user identifiers identifying a particular individual suspected of being associated with improper financial activity performed by the plurality of individuals;

presenting, via a user interface device, a user interface screen to facilitate identification of a ring of individuals performing improper financial activities, the user interface screen for selecting a list of financial transaction attributes to be included in one or more attribute tables wherein the list of financial transaction attributes includes at least a sentinel cookie attribute and a device fingerprint attribute;

combining, by an analysis tool implemented on a computing device at a second network location, a first list of identifiers with a first attribute table, wherein the first list of identifiers includes at least one identifier suspected of being associated with one or more improper financial activities and wherein the first attribute table corresponds to one or more attributes of financial transactions performed during a specified duration, the attributes including at least the sentinel cookie attribute and the device fingerprint attribute;

recursively linking until a stopping condition has been met, by the analysis tool, a digital file comprising the first list of identifiers with an attribute included in the first attribute table, wherein the stopping condition comprises a maximum number of links and wherein each link comprises a match between an identifier in the first list of identifiers with one or more attributes of the first attribute table;

generating, by the analysis tool, a composite table as a merged combination of the first list of identifiers and a portion of the first attribute table, wherein each row of the composite table includes a count parameter that corresponds to a number of times that a particular input party identifier and attribute combination were linked using first attribute table data for a specified time period;

repeating the recursively linking step and the generating the composite table step until the stopping condition has been met, wherein the composite table of a previous iteration is used as a second list of identifiers in a successive iteration;

generating, by the analysis tool, a first report when the stopping condition has been met, the stopping condition comprising one or both of a specified number of iterations and a maximum list size; and communicating, by the analysis tool the first report to a user, the first report including at least a portion of the composite table including a plurality of rows each including an identifier from the first or the second list of identifiers linked with one or more attributes of the first attribute table.

2. The method of claim 1, comprising receiving a referral including the first list of identifiers, the referral sent in response to a suspected pattern of improper financial activity within a specified time period wherein at least one identifier is associated with a financial transaction within the specified time period.

3. The method of claim 1, wherein linking the first list of identifiers with information included in the first attribute table includes:

creating, by the analysis tool, a first composite table, wherein each row of the first composite table is associated with an individual identifier that is linked with the attribute.

4. The method of claim 3, wherein linking the first list of identifiers with information included in the first attribute table includes:

creating, by the analysis tool, a second composite table including one or more rows corresponding to different identifiers each linked to an attribute, and one or more rows corresponding to different attributes each linked to an identifier.

5. The method of claim 1, comprising:

generating, by the analysis tool, a second list of identifiers corresponding to one or more identifiers that have been linked with attributes included in the attribute table; and repeating the combining step, linking step, and the generating step using the second list of identifiers.

6. The method of claim 5, comprising:

determining, by the analysis tool, that a specified stopping condition has not been met; and repeating the combining step, the linking step and the generating step until the stopping condition has been met.

7. The method of claim 6, wherein the stopping condition corresponds to at least one of a maximum number of iterations and a maximum table size.

8. The method of claim 1, comprising:

combining, by the analysis tool, the first list of identifiers with a second attribute table, wherein the first list of identifiers includes at least one identifier suspected of being associated with one or more improper financial activities and wherein the second attribute table is different than the first attribute table and corresponds to one or more attributes of financial transactions performed during a specified duration;

linking, by the analysis tool, the first list of identifiers with an attribute included in the second attribute table; and communicating, by the analysis tool, a second report to a user, the report including at least a portion of the list of identifiers linked with one or more attributes of the second attribute table.

9. The method of claim 8, comprising:

generating, by the analysis tool, a third list of identifiers corresponding to one or more identifiers that have been linked with attributes included in the second attribute table; and repeating the combining step, linking step, and the generating step using the third list of identifiers.

10. The method of claim 9, comprising:

repeating the combining step, linking step, and the generating step using the third list of identifiers with the attributes of the first attribute table and the attributes of the second attribute table.

11. The method of claim 1 further comprising limiting use of a particular attribute of the first attribute table based on a threshold, wherein the threshold corresponds to at least one of inclusion on an exclusion list and a link count associated with the particular attribute.

12. A computer system for identifying a plurality of individuals suspected of performing improper financial activity, the computer system comprising:
a processor;
a memory device communicatively coupled to the processor, the memory storing instructions that, when executed by the processor, cause the computer system to:
monitor, by a transaction monitoring system, a plurality of financial transactions for signs of improper financial activity;
generate, by the transaction monitoring system, a first list of identifiers, the first list of identifiers comprising one or more user identifiers suspected of being associated with improper financial activity performed by the plurality of individuals;
present, via a user interface device, a user interface screen to facilitate identification of a ring of individuals performing improper financial activities, the user interface screen for selecting a list of financial transaction attributes to be included in one or more attribute tables wherein the list of financial transaction attributes includes at least a sentinel cookie attribute and a device fingerprint attribute;
receive a first list of identifiers via a communication link, the first list of identifiers corresponding to a suspected pattern of improper financial activity occurring during a specified time period and wherein at least one identifier is associated with a financial transaction that occurred within the specified time period;
recursively link at least one identifier in the first list of identifiers to an attribute in a first attribute table, wherein the first attribute table corresponds to one or more attributes of financial transactions performed during a specified duration, wherein the at least one identifier is matched to the least one attribute in the first attribute table and wherein a stopping condition comprises a maximum number of links and wherein each link comprises a match between an identifier in the first list of identifiers with one or more attributes of the first attribute table;
generate a composite table as a merged combination of the first list of identifiers and a portion of the first attribute table, wherein each row of the composite table includes a count parameter that corresponds to a number of times that a particular input party identifier and attribute combination were linked using first attribute table data for a specified time period;
repeat the recursively link step and the generate the composite table step until the stopping condition has been met, wherein the composite table of a previous iteration is used as a second list of identifiers in a successive iteration;
generate a first report when the stopping condition has been met, the stopping condition comprising one or both of a specified number of iterations being performed or a maximum list size being reached; and
communicate, via a communication link, the first report to a user, the first report including a subset of the first or second list of identifiers linked with one or more attributes of the first attribute table forming a composite table, wherein each row of the composite table corresponds to an individual identifier and its linked attribute.

13. The system of claim 12, wherein the memory is further configured to store instructions, that when executed by the processor, cause the computer system to:
generate a second list of identifiers corresponding to one or more identifiers that have been linked with attributes included in the attribute table; and
repeating linking identifiers to the attributes of the attribute table and generating a list of identifiers corresponding to one or more identifiers linked in the attribute table until a stopping condition has been met.

14. The system of claim 13, wherein the memory is further configured to store instructions, that when executed by the processor, cause the computer system to:
determine whether a specified end condition has been met;
if not, linking identifiers to the attributes in the attribute table until the specified end condition has been met; and
if so, communicate, by the computer system, generate the report including results of the combining, linking, and generating steps.

15. The system of claim 14, wherein the end condition corresponds to at least one of a maximum number of iterations and a maximum table size.

16. The system of claim 12, comprising a reporting computer communicatively coupled to the computer system via the communication link, the reporting computer including a user interface including at least one screen for presenting the first report to the user.

17. The system of claim 12, comprising a user interface device communicatively coupled to the computer system via the communication link, the user interface device including a processor and a memory, wherein the memory is configured to store instructions, that when executed by the processor, cause the user interface device to:
identify one or more financial transactions corresponding to potential improper financial activity; and
determine one or more user identifiers associated one or more suspect financial transactions, the user identifiers included on the first list of identifiers.

18. The system of claim 12, wherein the memory is further configured to store instructions, that when executed by the processor, cause the computer system to:
link at least one identifier in the first list of identifiers to an attribute in a second attribute table different from the first attribute table, wherein the second attribute table corresponds to one or more attributes of financial transactions performed during a specified duration; and
communicate, via a communication link, a second report to a user, the report including at least a portion of the first list of identifiers linked with one or more attributes of the second attribute table.

19. The system of claim 18, wherein the memory is further configured to store instructions, that when executed by the processor, cause the computer system to:
generate a third list of identifiers corresponding to one or more identifiers that have been linked with attributes included in the second attribute table; and
repeating linking identifiers to the attributes of the attribute table and generating a list of identifiers corresponding to one or more identifiers linked with attributes in the second attribute table until a stopping condition has been met.

* * * * *